(12) United States Patent
Strum

(10) Patent No.: US 7,806,273 B2
(45) Date of Patent: ***Oct. 5, 2010

(54) SYSTEM AND METHOD FOR MANAGING CLIENT - SERVER COMMUNICATIONS OVER COMPUTER NETWORK USING TRANSMISSION SCHEDULE

(76) Inventor: William E. Strum, 8016 MacArthur Blvd., Cabin John, MD (US) 20818

( * ) Notice: Subject to any disclaimer, the term of this patent is extended or adjusted under 35 U.S.C. 154(b) by 0 days.

This patent is subject to a terminal disclaimer.

(21) Appl. No.: 11/878,119

(22) Filed: Jul. 20, 2007

(65) Prior Publication Data

US 2007/0266086 A1  Nov. 15, 2007

Related U.S. Application Data

(63) Continuation of application No. 09/695,932, filed on Oct. 26, 2000, now Pat. No. 7,254,605.

(51) Int. Cl.
  *G06F 13/00* (2006.01)
(52) U.S. Cl. .................................................... 209/232
(58) Field of Classification Search ................. 709/232
  See application file for complete search history.

(56) References Cited

U.S. PATENT DOCUMENTS

| | | | |
|---|---|---|---|
| 5,355,445 | A | 10/1994 | Shibao et al. |
| 5,365,266 | A | 11/1994 | Carpenter |
| 5,572,678 | A | 11/1996 | Homma et al. |
| 5,590,181 | A | 12/1996 | Hogan et al. |
| 5,664,106 | A | 9/1997 | Caccavale |
| 5,676,138 | A | 10/1997 | Zawilinski |
| 5,749,043 | A | 5/1998 | Worthy |
| 5,802,311 | A | 9/1998 | Wronski |
| 5,806,068 | A | 9/1998 | Shaw et al. |
| 5,812,642 | A | 9/1998 | Leroy |
| 5,828,376 | A | 10/1998 | Solimene et al. |
| 5,848,396 | A | 12/1998 | Gerace |

(Continued)

OTHER PUBLICATIONS

"Digital Equipment Corporation Provides First Interactive Participation in Presidential Debates," from DIALOG (R) File 813:PR Newswire, 2 pages (Oct. 3, 1996).

(Continued)

*Primary Examiner*—Robert B Harrell
(74) *Attorney, Agent, or Firm*—Sterne, Kessler, Goldstein & Fox P.L.L.C.

(57) ABSTRACT

A computer-implemented transmission scheme is provided to control client-server interchanges within a distributed communications network, such as a real time opinion research system. Interchanges include transmitting media streams between one or more clients to a server over a network. Periodic interchanges can be simultaneously or staggeredly transmitted to a sampling pool of active clients. A transmission mode unit implements the transmission scheme. A parameter selector establishes the transmission interval and transmission period used to trigger each interchange. A client assignor creates one or more sampling classes from the sampling pool by applying a sampling quotient generated by the parameter selector. A schedule editor produces a transmission schedule for the active clients. If more than one sampling class has been created, each sampling class would receive a separate transmission schedule for providing staggered transmissions at designated transmission intervals. The transmission schedule can include other data preparation and formatting instructions for compression, aggregation and packetization.

40 Claims, 8 Drawing Sheets

U.S. PATENT DOCUMENTS

| | | | |
|---|---|---|---|
| 5,924,072 | A | 7/1999 | Havens |
| 5,937,397 | A | 8/1999 | Callaghan |
| 6,011,578 | A | 1/2000 | Shatto et al. |
| 6,012,096 | A | 1/2000 | Link et al. |
| 6,021,426 | A | 2/2000 | Douglis et al. |
| 6,055,542 | A | 4/2000 | Nielsen et al. |
| 6,061,082 | A | 5/2000 | Park |
| 6,070,145 | A * | 5/2000 | Pinsley et al. .............. 705/10 |
| 6,098,179 | A | 8/2000 | Harter, Jr. |
| 6,151,696 | A | 11/2000 | Miller et al. |
| 6,182,110 | B1 * | 1/2001 | Barroux ................. 709/201 |
| 6,182,125 | B1 | 1/2001 | Borella et al. |
| 6,322,368 | B1 | 11/2001 | Young et al. |
| 6,353,849 | B1 | 3/2002 | Linsk |
| 6,403,610 | B1 | 6/2002 | Malleron et al. |
| 6,442,603 | B1 | 8/2002 | Borella |
| 6,490,575 | B1 | 12/2002 | Berstis |
| 6,542,464 | B1 | 4/2003 | Takeda et al. |
| 6,601,098 | B1 | 7/2003 | Case et al. |
| 6,654,909 | B1 | 11/2003 | Quach et al. |
| 6,760,595 | B2 | 7/2004 | Inselberg |
| 6,862,622 | B2 | 3/2005 | Jorgensen |
| 2001/0052122 | A1 * | 12/2001 | Nanos et al. ............... 725/9 |
| 2002/0046085 | A1 * | 4/2002 | Rochon et al. ............ 705/14 |
| 2002/0059218 | A1 | 5/2002 | August et al. |
| 2002/0199198 | A1 | 12/2002 | Stonedahl |

OTHER PUBLICATIONS

Excerpts from Digital Equipment Corporation's InPulse Web Site retrieved from http://web.archive.org/... on Jun. 19, 2002 (these sites were archived on Dec. 21, 1996, Apr. 18, 1997, Jan. 10, 1998), 32 pages.

Information about Columbia Information Systems' Perception Analyzer™ retrieved from http://web.archive.org/... on Jun. 15, 2002 (web site archived on May 7, 1999), 10 pages.

"Under Boardwalk, Down by Sea Mornings on NBC," from DIALOG (R) File 733: The Buffalo News, 2 pages (Jul. 14, 1999).

Tornabene, Samuel G., "Thirty Seconds," *Electric Perspectives*, vol. 20, No. 5, pp. 22-26, 28, 30, 32, 34, and 35 (Sep./Oct. 1995).

"WorldVote 96: First Internet-based Mock Presidential Election Launched," from DIALOG (R) File 813: PR Newswire, 3 pages (Oct. 30, 1996).

"NorthStar Interactive enhances 'SiteTest' research service for Web publishers," from DIALOG (R) File 16: Gale Group PROMT (R), 2 pages (May 29, 1997).

"SpeakOut.com and MSNBC Join Forces to Enhance GOP Debate Coverage; Internet Startup Will Feed Survey Data to Cable News Network," from DIALOG (R) File 16: Gale Group PROMT (R), 2 pages (Dec. 9, 1999).

"Rare Medium Group Inc. Invests in SpeakOut.com," from DIALOG (R) File 16: Gale Group PROMT (R), 2 pages (Oct. 25, 1999).

Hazlett, R. L. et al., "Emotional Response to Television Commercials: Facial EMG vs. Self-Report," from DIALOG (R) File 16: Gale Group PROMT (R), 18 pages (Mar. 1999).

*Oracle Darwin Data Mining Software*, the Oracle Corporation, printed Apr. 4, 2000 from http://www.oracle.com/datawarehouse/products/datamining/index.html, 2 pages (Copyright 1995-2000).

*Oracle Datawarehouse Site*, the Oracle Corporation, printed Apr. 4, 2000 from http://www.oracle.com/datawarehouse/products/bitools.html, 2 pages (Copyright 1995-2000).

*DoubleClick Products—The Global Internet Advertising Solutions Company*, DoubleClick Inc., printed Feb. 20, 2000 from http://www.doubleclick.net:8080/company_info/about_doubleclick/products.htm, 3 pages (Copyright 1996-2000).

*Autonomy, Technology White Paper*, Autonomy Inc., pp. 1-16 (1998).

*Technology—The Technology Behind Autonomy*, printed Feb. 20, 2000 from http://www.autonomy.com/tech/indcx.html, 2 pages.

*Knowledge Management—ActiveKnowledge™ Features*, printed Feb. 20, 2000 from http://www.autonomy.com/knowledge/akfeatures.htm, 2 pages.

*Knowledge Management—ActiveKnowledge™ Overview*, printed Feb. 20, 2000 from http://www.autonomy.com/knowledge/akintro.htm, 2 pages.

*Knowledge Management—ActiveKnowledge™ Datasheet*, printed Feb. 20, 2000 from http://www.autonomy.com/knowledge/akdatasheet.htm, 2 pages.

*Knowledge Management—ActiveKnowledge™ Architecture*, printed Feb. 20, 2000 from http://www.autonomy.com/knowledge/akarchitecture.htm, 2 pages.

*Knowledge Management*, printed Feb. 20, 2000 from http://www.autonomy.com/knowledge/index.html, 2 pages.

*Knowledge Management—Knowledge Server™ Overview*, printed Feb. 20, 2000 from http://www.autonomy.com/knowledge/ksintro.htm, 1 page.

*Electronic Commerce—Customer Profiling™*, printed Feb. 20, 2000 from http://www.autonomy.com/ecommerce/cprofiling.html, 1 page.

Comer, Douglas E., *Internetworking with TCP/IP, Principles, Protocols, and Architecture*, vol. 1, Third Edition, Prentice-Hall, Inc., Upper Saddle River, New Jersey, pp. 209-215 (1995).

* cited by examiner

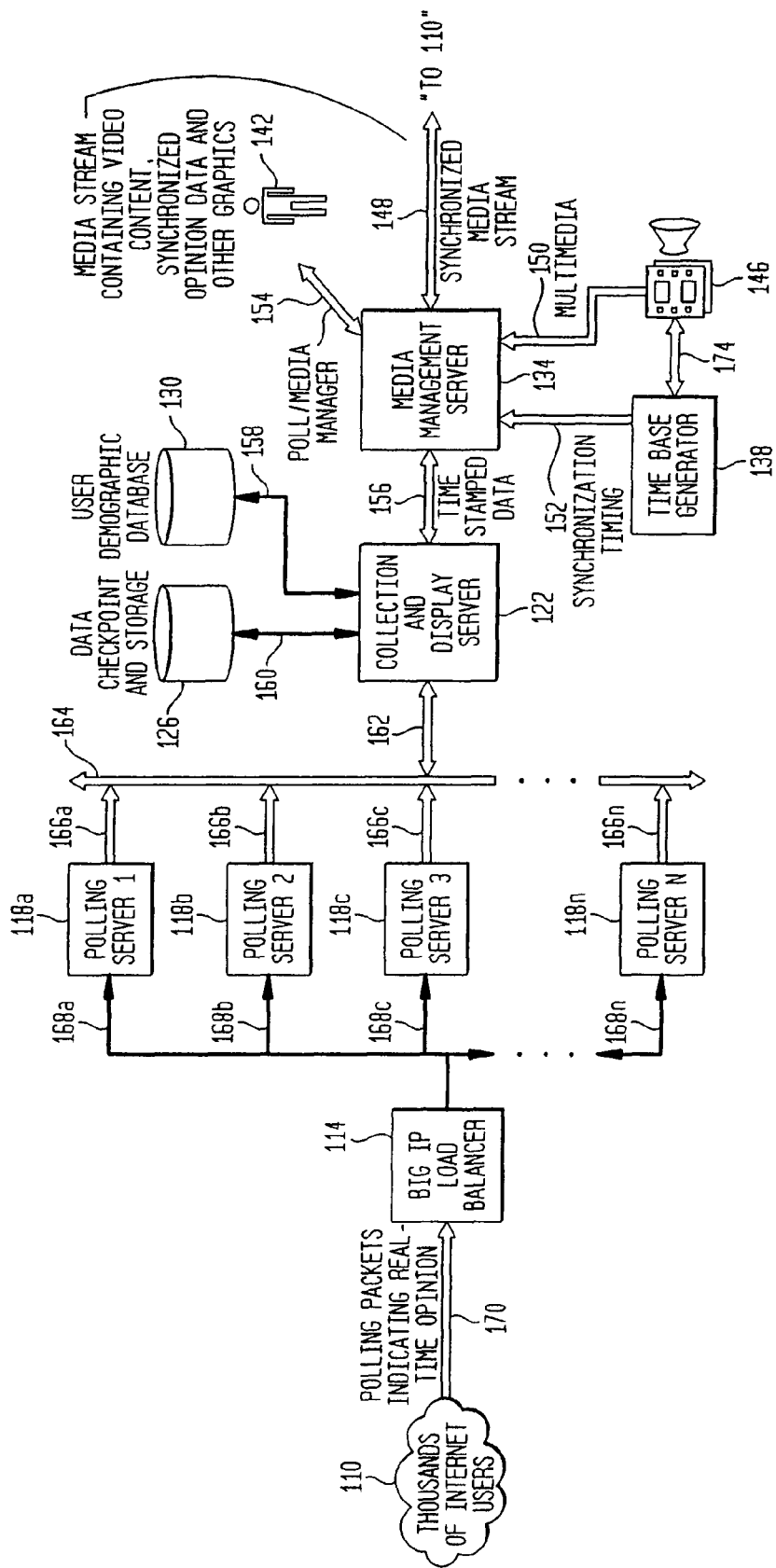

CLIENT GUI 200A

CLIENT GUI 200B

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| CLASS 1 | 0 | 0 | 0 | 1 | 0 | 0 | 0 | 1 | 0 | 0 | 0 | 1 | 0 | 0 | 0 | 1 | 0 | 0 | 0 | 1 | 0 |
| CLASS 2 | 0 | 0 | 0 | 0 | 1 | 0 | 0 | 0 | 1 | 0 | 0 | 0 | 1 | 0 | 0 | 0 | 1 | 0 | 0 | 0 | 1 |
| CLASS 3 | 0 | 0 | 0 | 0 | 0 | 1 | 0 | 0 | 0 | 1 | 0 | 0 | 0 | 1 | 0 | 0 | 0 | 1 | 0 | 0 | 0 |

FIG. 7

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| PRIMARY CLASS | 0 | 0 | 0 | 1 | 0 | 0 | 0 | 1 | 0 | 0 | 0 | 1 | 0 | 0 | 0 | 1 | 0 | 0 | 0 | 1 | 0 |
| SECONDARY CLASS 1 | 0 | 0 | 0 | 0 | 0 | 0 | 0 | 0 | 0 | 1 | 0 | 0 | 0 | 1 | 1 | 0 | 0 | 0 | 0 | 1 | 0 |
| SECONDARY CLASS 2 | 0 | 0 | 0 | 0 | 0 | 0 | 1 | 0 | 0 | 0 | 0 | 0 | 0 | 0 | 0 | 0 | 0 | 0 | 0 | 0 | 1 |

FIG. 8

SYSTEM AND METHOD FOR MANAGING CLIENT - SERVER COMMUNICATIONS OVER COMPUTER NETWORK USING TRANSMISSION SCHEDULE

CROSS-REFERENCE TO RELATED APPLICATIONS

This application is a continuation of U.S. Patent application Ser. No. 09/695,932, filed Oct. 26, 2000, now U.S. Pat. No. 7,254,605, which is incorporated by reference herein in its entirety. This application is related to pending U.S. patent application Ser. No. 11/826,363, filed Jul. 13, 2007, which is incorporated by reference herein in its entirety.

The following United States utility patent applications have a common assignee and contain some common disclosure:

"An Internet-Based Real-Time System and Method," U.S. Provisional Pat. Appl. No. 60/177,704, by William E. Strum, filed Jan. 24, 2000, which is incorporated by reference herein in its entirety.

"System, Method and Computer Program Product for Producing Real Time Polls of Media Events," U.S. patent application Ser. No. 09/544,624, by William E. Strum, filed Apr. 6, 2000, which is incorporated by reference herein in its entirety (hereinafter referred to as "the '624 application").

"System, Method and Computer Program Product for Collection of Opinion Data," U.S. patent application Ser. No. 09/614,862, by William E. Strum, filed Jul. 12, 2000, which is incorporated by reference herein in its entirety.

"System, Method and Computer Program Product for Dynamically Interacting with Web Media Using an Icon to Obtain Demographically Filtered Resources," U.S. Provisional Pat. Appl. No. 60/185,117, by Howard et al., filed Feb. 25, 2000, which is incorporated by reference herein in its entirety.

"System, Method and Computer Program Product for Dynamically Interacting with Web Media Using an Icon to Obtain Context Sensitive Resources," U.S. patent application Ser. No. 09/544,337, by Howard et al., filed Apr. 6, 2000, which is incorporated by reference herein in its entirety.

"System, Method and Computer Program Product for Online Panel Recruitment for Opinion Research," U.S. patent application Ser. No. 09/544,623, by William E. Strum, filed Apr. 6, 2000, which is incorporated by reference herein in its entirety.

"Method, System and Computer Program Product for Controlling Data Loss in a Distributed Opinion Research Network," U.S. patent application Ser. No. 09/695,929, by William E. Strum, filed Oct. 26, 2000, which is incorporated by reference herein in its entirety.

BACKGROUND OF THE INVENTION

1. Field of the Invention

The present invention relates generally to internetworking. More specifically, the present invention pertains to controlling multimedia communications over data networks.

2. Related Art

Global computer networks, such as the Internet, provide a myriad of opportunities for the opinion research industry. Opinion gathering tools, such as dial polls and surveys, can be developed to reach millions of individuals to extract their positions and predispositions toward a variety of topics and issues. Online polls and surveys enable respondents to furnish input and view the reactions of other respondents instantly. An example of an opinion research system that provides real time opinion gathering is described in the '624 application. The opinion research system of the '624 application enables a plurality of online respondents to view an event and participate in an opinion poll. The respondents receive real time feedback on their client displays that indicate each respondent's opinion value as well as the composite opinion value for the entire panel.

A challenge to Internet-based opinion research systems is the ability to effectively manage online sessions having very large panel sizes while maintaining continuous data interchanges between the server and clients and supplying the most current and accurate opinion values. Although the standard Internet Protocol (IP) (defined in Internet Standard (STD) 5, Request for Comments (RFC) 791 (Internet Architecture Board)), has been developed to govern communications over public and private Internet backbones, the protocol does not guarantee quality of service (QoS). Bandwidth availability, latency, and data loss can impede the effectiveness of opinion gathering and substantially hinder a respondent's ability to receive and comprehend the data in a real time environment.

Typically, IP networks lack sufficient infrastructure to permit a computer application to reserve the requisite bandwidth to communicate over a computer network. The amount of available bandwidth depends on numerous factors, such as the time of day and locality of the client or server. The packet size for the data that is being transmitted is another limiting factor. A significant amount of efficiency can be lost due to packet overhead that contains substantial header information. If the client or server is not able to reserve sufficient bandwidth, client-server communications can suffer from substantial data delay or loss. Therefore, an opinion research server's ability to effectively interact with a respondent's computer and provide real time updates can be adversely affected by bandwidth availability.

As intimated, packet overhead manifests larger bandwidth requirements. One possible solution to reducing packet overhead is to buffer and aggregate the frames into a single data packet (e.g., IP datagram or protocol data unit (PDU)). However, buffering the frames can also produce data delay or latency. Generally, latency increases proportionally to the number of frames being buffered. Data transmissions for electronic mail (email) or facsimile messages generally can tolerate delays in receiving the data packets without sacrificing QoS. However, during real time communications, delays in receiving data packets can significantly impair the accuracy and completeness of the transmitted data. In real time opinion research systems, such delays can also substantially impair the respondent's ability to view and comprehend the opinion data.

The integrity and accuracy of online opinion research systems can also be adversely affected by data packets being lost during the transmission. Generally speaking, IP and User Datagram Protocol (UDP) environments cannot guarantee network reliability. Data packets can be lost or delayed for a variety of reasons, such as bandwidth congestion, unavailable routes, defective Internet engines, and the like. If a data packet is lost, the only way to retrieve it is to request the originator to retransmit the data packet.

This, of course, would add additional delays to receiving the opinion data, thus degrading the quality of the network and providing an unsuitable medium for real time communications.

What is needed is a system and method for internetworking real time opinion research data that overcomes the above problems.

SUMMARY OF THE INVENTION

The system, method, and computer program product of the present invention implement a transmission scheme to control client-server interchanges within a distributed communications network, such as a real time opinion research system. Interchanges include transmitting data streams between one or more clients to a server over a computer network, including the global Internet.

A transmission mode unit implements the transmission scheme. The transmission mode unit, in an embodiment, includes a parameter selector, client assignor and schedule editor. The parameter selector establishes the transmission interval and transmission period that are used to trigger each communication interchange. The client assignor creates one or more sampling classes from the sampling pool by applying a sampling quotient that is generated by the parameter selector. The schedule editor produces a transmission schedule for the active clients.

The transmission schedule can be used to interchange communications with the clients simultaneously or in a staggered manner. Periodic interchanges can be simultaneously or staggeredly transmitted to a sampling pool of active clients. If more than one sampling class has been created, each sampling class would receive a separate transmission schedule for providing staggered transmissions at designated transmission intervals.

The transmission schedule can include other data preparation and formatting instructions, including data compression, aggregation and packetization.

An advantage of the present invention is the ability to increase the number of users that a server can manage during live opinion research or a data capturing event.

A feature of the present invention is that it provides a continuous stream of data to be shown and captured without loss, so that the viewer experiences a continuous stream of information associated with the event as it occurs.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left most digit (s) of a reference number identifies the drawing in which the reference number first appears.

FIG. 1 illustrates a high level block diagram of the configuration of a real time opinion research system according to an embodiment of the present invention.

FIG. 7 illustrates a schedule for transmitting staggered communications with a plurality of sampling classes according to an embodiment of the present invention.

FIG. 8 illustrates a schedule for transmitting staggered communications with a plurality of sampling classes according to another embodiment of the present invention.

DETAILED DESCRIPTION OF THE PREFERRED EMBODIMENTS

Figure 2A:
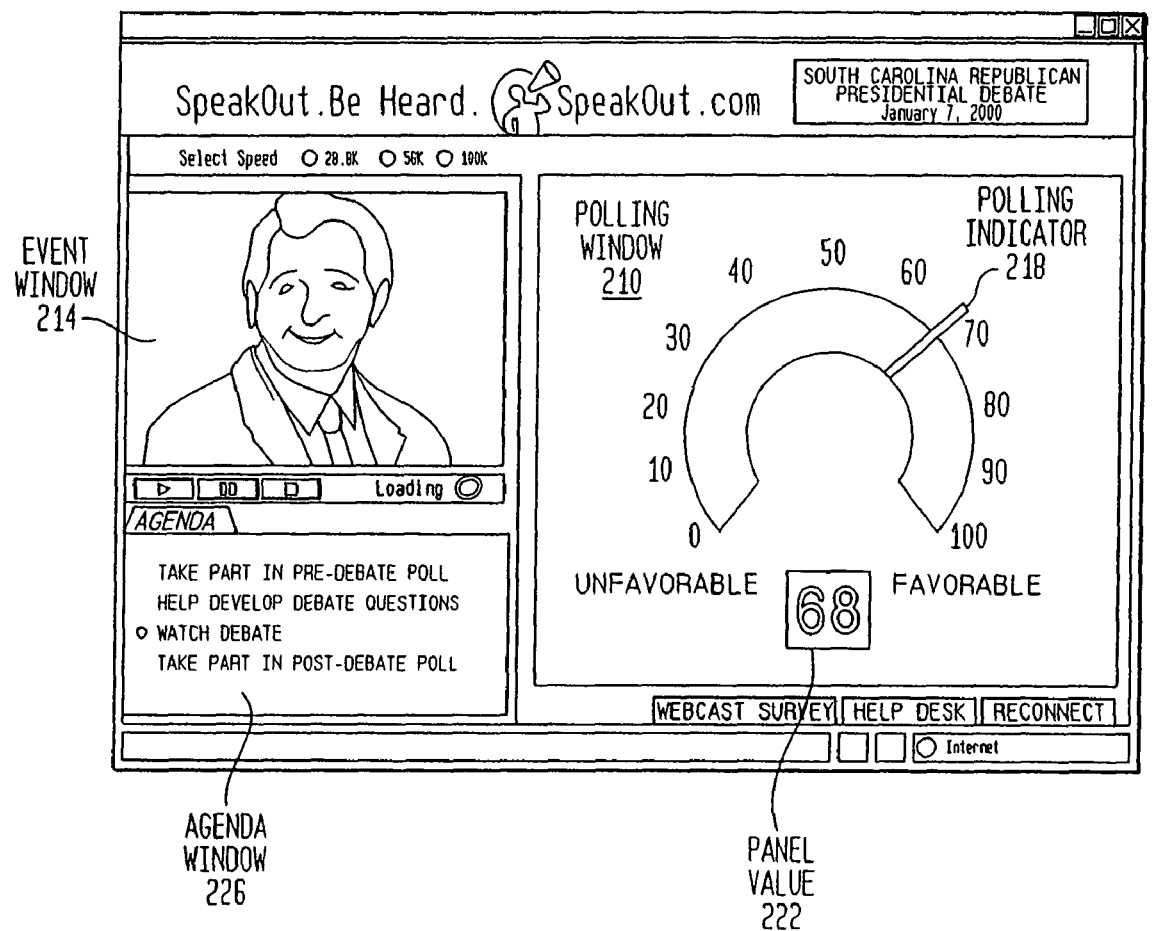
FIG. 2a illustrates a graphical user interface (GUI) for a client according to an embodiment of the present invention.

Table of Contents
I. Real Time Opinion Research System
II. Polling Clients
III. Media Management Server
IV. Transmission Mode Management
V. Software and Hardware Embodiments
VI. Generating Transmission Schedules
VII. Conclusion I. Real Time Opinion Research System The method and system of the present invention provide for the management of data interchanges over a computer network, including the global Internet or wireless networks. A transmission scheme optimizes the flow of data within an opinion research system to improve reliability and accuracy. The opinion research system is preferably, but not necessarily, of the type described in the commonly assigned '624 application.

FIG. 1 illustrates, according to an embodiment of the present invention, a block diagram of a real time opinion research system 100 ("system 100") for collecting, analyzing and reporting opinion research data. As shown in FIG. 1, system 100 includes a media management server 134 in communication with one or more multimedia devices 146. Multimedia devices 146 include, but are not limited to, a video camera, record/playback device (RPD), and other devices capable of producing audio, video, text, graphics or any combination thereof to be sent over a network connection. RPD can be a video tape recorder/player (VTR), a video server, a virtual recorder, a digital audio tape (DAT) recorder, or any device that stores, records, generates or plays back via magnetic, optical, electronic, or any other storage media. Multimedia devices 146 can also include devices capable of producing video and audio from a video game, VCR, camcorder, laser disk, digital video disc or digital versatile disc (DVD) player and satellite receiver. Line 150 represents a logical communication path between media management server 134 and the multimedia devices 146 listed above.

While the above is a representative list of multimedia devices that can be used in the present invention, it should be understood that any other multimedia device, including, but not limited to, video recorders/servers, and virtual sets, could be easily included and would not change the scope of the invention. Any presently available or future developed device that is responsive to a general purpose interface is encompassed by the present invention. In addition, live feeds (such as, speeches, debates, presentations, contests, pageants, news reports, sporting events, and the like) from any type of source, including satellite, terrestrial (fiber optic, copper, coaxial, and the like), radio, microwave or any other form or method of transmission, can be provided in lieu of multimedia devices in accordance with the present invention.

A poll/media manager 142 uses media management server 134 to conduct opinion research for an event, such as, speeches, television programs, commercials, and the like. In an embodiment, media management server 134 displays a graphical user interface (GUI) on a display device (not shown). Line 154 represents a logical communication path between media management server 134 and the display GUI. Poll/media manager 142 utilizes the display GUI to program and control media management server 134.

Media management server 134 is also in communication with time base generator 138 that supports time stamping. Time base generator 138 can be a stand-alone device or implemented as a computer software application. Line 152 represents a logical communication path between media management server 134 and time base generator 138. Line 174 represents a logical communication path between time base generator 138 and multimedia devices 146. Media management server 134 utilizes time generator 138 to control the creation, synchronization and management of media streams from multimedia devices 146. The synchronized media streams are routed to a respondent, or panel of respondents, over a diverse computer network 110, which includes wired or wireless local area networks (LANs) and/or wide area networks (WANs), such as the global Internet (including the World-Wide Web (WWW)). Line 148 represents a logical communication path between media management server 134 and computer network 110. Thus, system 100 utilizes computer network 110 to communicate with respondents via one or more clients (not shown). The clients enable the respondents to interact with system 100.

System 100 also includes a load balancer 114, which receives input from all respondents. Load balancer 114 communicates with one or more polling servers 118a 118n. Line 170 represents a logical communication path between computer network 110 and load balancer 114. Similarly, line 168 (shown as 168a 168n in FIG. 1) represents a logical communication path between load balancer 114 and polling servers 118a 118n. After receiving input (i.e., a data stream containing an opinion value) from the respondents, load balancer 114 routes the data stream to polling servers 118a 118n. Load balancer 114 serves as a mechanism to allocate system resources to maximize efficiency. Load balancer 114 is an optional component of system 100, and in an embodiment of the present invention, system 100 can function without load balancer 114 to permit the client data streams to flow directly to an available polling server 118a-118n. Moreover, other load balancing configurations can replace the one shown in FIG. 1. For example, an architecture, such as the Load Balancing Systems developed by Microsoft®, can be utilized.

Polling servers 118a 118n process the data stream to statistically analyze the respondents' opinions. Polling servers 118a 118n communicate with user demographic database 130, data checkpoint and storage database 126 and collection and display server 122. User demographic database 130 provides a centralized repository of demographic information on the respondents. Polling servers 118a 118n maintain a copy of a respondent's demographic records in its resident memory and uses the information to analyze the respondents' opinion data. During the analysis process, the resident memory in polling servers 118a 118n is periodically backed up in data checkpoint and storage database 126.

System 100 also includes collection and display server 122, which communicates with polling servers 118a 118n, data checkpoint and storage database 126, user demographic database 130 and media management server 134. Collection and display server 122 receives statistical data from polling servers 118a 118n and aggregates the data to produce a composite result for a single event. Line 166 (shown as 166a 166n in FIG. 1) represents a logical communication path from polling servers 118a 118n to collection and display server 122. In an embodiment, collection and display server 122 exchanges demographic data with user demographic database 130 and back up data with data checkpoint and storage database 126. Lines 158 and 160 show logical communication paths for the demographic and back up data, respectfully. In this embodiment, collection and display server 122 also exchanges the demographic and back up data with polling servers 118a 118n. A logical communication path representing the exchange of data with polling servers 118a 118n is illustrated in FIG. 1 by line 162. Collection and display server 122 and polling servers 118a 118n are connected to communication infrastructure 164 (e.g., communications bus, cross over bar, or network) that provides bi directional communications.

Polling servers 118a 118n, collection and display server 122 and media management server 134, each, represent one or more computers providing various shared resources with each other and to the other network computers. The shared resources include files for programs, web pages, databases and libraries; output devices, such as, printers, plotters and audio/video recorders and players; and communications devices, such as modems and Internet access facilities. The communications devices can support wired and wireless communications, including satellite, terrestrial (fiber optic, copper, coaxial and the like), radio, microwave and any other form or method of transmission. Each server is configured to support the standard Internet Protocol (IP) developed to govern communications over public and private Internet backbones. The protocol is defined in Internet Standard (STD) 5, Request for Comments (RFC) 791 (Internet Architecture Board). The servers can also support transport protocols, such as, Transmission Control Protocol (TCP), User Datagram Protocol (UDP) and Real Time Transport Protocol (RTP). In an embodiment, the servers use a TCP/IP protocol to provide communications between any two nodes on the network. In another embodiment, a UDP/IP protocol suite is implemented. Each server is also configured to support various operating systems, such as, Netware™ available from Novell®; MS DOS®, Windows NT® and Windows® 3.xx/95/98/2000 available from Microsoft®; Linux® available from Linux Online Inc.; Solaris™ available from Sun Microsystems, Inc.; and the like as would be apparent to one skilled in the relevant art(s).

II. Polling Clients

As discussed above, system 100 communicates with one or more clients over computer network 110. Each client can be a personal computer, personal digital assistant (PDA), telephone, television, set-top box or like devices linked to computer network 110 and including a display device with the ability to select one or more events and indicate an opinion. The display device for the client provides a text or graphical user interface (GUI) and enables a respondent to interactively communicate with media management server 134 and load balancer 114 (or, if not included, with polling servers 118a-118n).

FIG. 2a illustrates an embodiment of client GUI 200A for the client display. GUI 200A can display one or more windows. Agenda window 226 provides a menu of various options that a user (i.e., respondent) can select. In an embodiment, selecting "watch debate" would send a request to present a video of an event in event window 214. In an embodiment, event window 214 manages the display and respondent interaction with the media streams that are routed to the respondent from media management server 134. The media streams contain the event that is being reviewed and polled by the respondent. Event window 214 can be used to evaluate the respondent's opinion regarding a variety of events, such as, testing of speeches, debates and presentations; analysis and testing of commercials and their elements; reactions to new product introductions; response analysis for movie and television programs and content; response to personalities in live or test situations; testing and evaluation of testimony and summaries in litigation support applications; and the like as would be apparent to one skilled in the relevant art(s).

Accordingly, system 100 can be used to conduct live and on demand polls. System 100 and the clients can be configured to support RealNetworks®, Microsoft® and Apple® media player applications, or other applications for downloading and/or streaming media as would be apparent to a person skilled in the relevant art(s). As such, event window 214 operates with a third party media management client to manage the display and respondent interaction with the event and serves as the transport platform for the delivery of frame synchronization data for real time opinion research system 100.

In an embodiment, the event is routed to the respondent from media management server 134. In another embodiment, the event can be routed to the respondent from a third party source. For example, the respondent can request to view an event from another web site, such as streaming a live newscast from a news service. In this embodiment, the third party would provide the time stamped media frames to be synchronized with polling system 100 as discussed below. The event can also be contained on a storage medium located within or connected to the client. For instance, the event can be read from a hard disk drive, removable storage drive, removable storage interface, and the like as described in more detail below.

GUI 200A also includes polling window 210 that provides a graphical representation of the respondent's current opinion. FIG. 2a illustrates an embodiment of the graphical representation. In this embodiment, the respondent can indicate an opinion by interacting with an input device (not shown) that moves polling indicator 218 to designate a discrete value between 0 and 100. "0" represents a strongly unfavorable response, "50" represents a neutral response, and "100" represents a strongly favorable response. As can be seen, the graphical representation of the respondent's opinion can be illustrated as a dial or other graphical metaphors as would be apparent to one skilled in the relevant art(s). As shown, the opinion values are expressed as discrete values ranging from 0 100. However, polling indicator 218 can express opinion values in various discrete or analog schemes, including metaphorical references, such as facial or hand expressions, directional signals, arrows, plus or minus signs, other contrasting graphical icons, and the like.

Figure 2B:
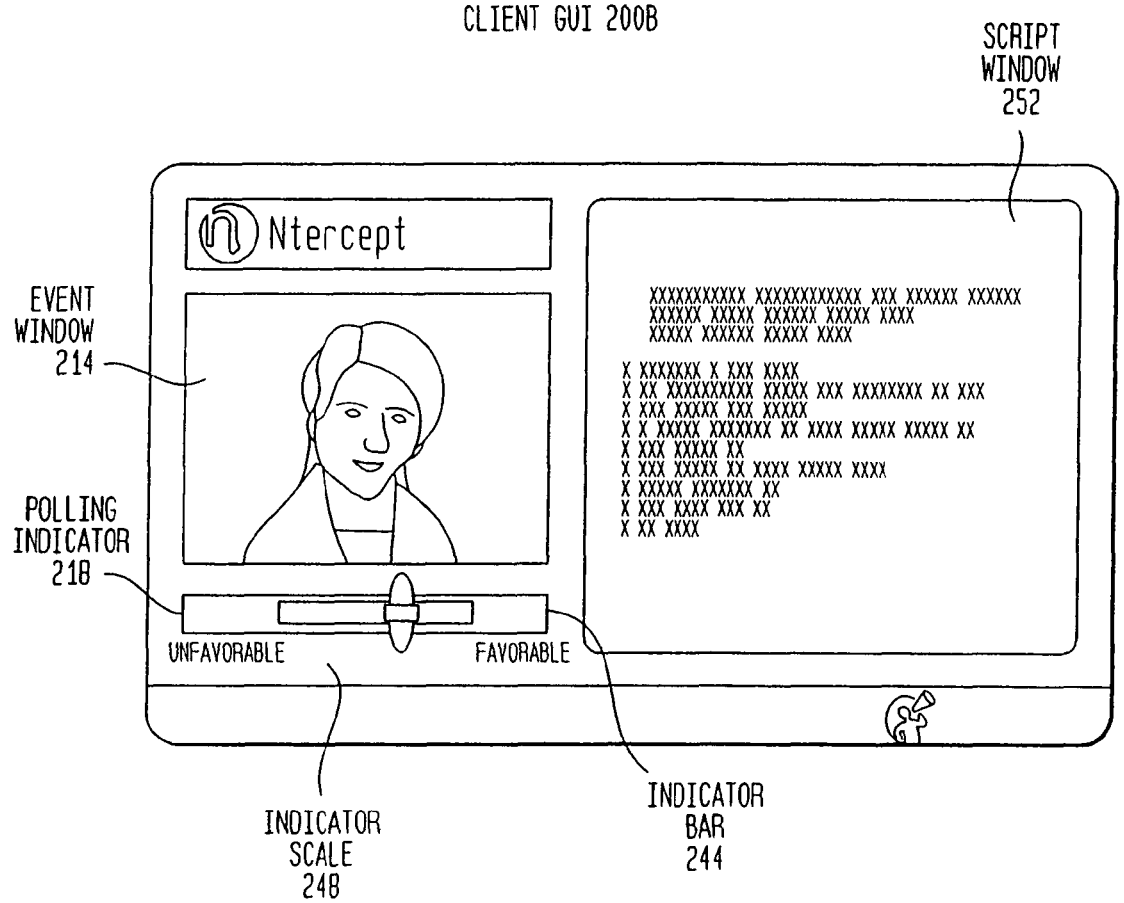
FIG. 2b illustrates a GUI for a client according to another embodiment of the present invention.

Thus, various embodiments of the GUI for the client, including polling window 210, can easily be included with the methods and systems of the present invention. Any currently available or future developed user interface functional for collecting and sending opinion values to polling server 118*a* 118*n* is considered to be within the scope of the present invention. Accordingly, FIG. 2b illustrates another embodiment of a GUI for the client (shown as GUI 200B). As shown, GUI 200B includes event window 214, indicator bar 244, polling indicator 218, indicator scale 248 and script window 252. As discussed in reference to FIG. 2a, event window 214 provides a forum for presenting a video, audio, multimedia or like forms of the event being polled.

Adjacent to event window 214, script window 252 receives captions or text from the polled event. Therefore, in an embodiment, a complete transcript of the polled event is synchronized with the media streams and displayed in script window 252. In an embodiment, the event is provided with captions or text from the source. In another embodiment, well known captioning and stenographic technologies are used to produce the captions or text and synchronize the data with the media stream. The methods and systems of the present invention supports both live and delayed captioning for the events. Accordingly, in an embodiment, real time captions or text can be created and matched to the audio track as live or delayed media streams are sent to the clients. In another embodiment, pre recorded media streams can be processed to generate the captions or text that are timed and matched to the media streams.

As discussed, the captions are displayed in script window 252. However, in an embodiment, event window 214 is configured to support embedded captioning in media streams. Therefore, in this embodiment, the captions are located in image displayed in event window 214 in lieu of, or in addition to, script window 252.

Referring to FIG. 2b, positioned beneath event window 214 is indicator bar 244. A respondent moves or slides polling indicator 218 along the axis of indicator bar 244 to specify an opinion value for the event presented in event window 214. As shown in FIG. 2b, indicator bar 244 can be illustrated as a line segment in a horizontal position on GUI 200B. As would be apparent to one skilled in the relevant art(s), indicator bar 244 can vary in shape, size and layout. As such, in other embodiments, indicator bar 244 can be depicted in a vertical position, displayed in the form of an arc or circle, shaped like a polygon, and the like. As shown in FIG. 2b, indicator bar 244 can be illustrated in two dimensional space. Alternatively, indicator bar 244 can be displayed with three or more coordinate dimensions.

Indicator scale 248 provides an array of possible opinion values to be selected by the respondent. As discussed with reference to FIG. 2a, the opinion values can be expressed as discrete values ranging from 0 100. Indicator scale 248 can also be expressed in various discrete or analog schemes, including metaphorical references, such as facial or hand expressions, directional signals, arrows, plus or minus signs, other contrasting graphical icons, and the like. The textual labeling for indicator scale 248 can express categories, such as, strongly agree, agree, neutral, disagree and strongly disagree, and the like. As shown in FIG. 2b, the textual labeling for indicator scale 248 can always be present for ease of reference. In another embodiment, the textual labeling can be formatted to change intensity or color as polling indicator 218 traverses indicator bar 244. In another embodiment, indicator scale 248 can be blank, and part or all of the textual labeling can be formatted to appear only as polling indicator 218 is moved.

Referring to FIG. 2b, a display area is positioned on top of polling indicator 218 to display an opinion value. Thus, as polling indicator 218 traverses indicator bar 244, the display area would dynamically reveal a specific opinion value corresponding to indicator scale 248. As discussed with reference to indicator scale 248, the display area can also produce discrete values, or metaphorical expressions and the like. In an embodiment, indicator scale 248 is blank, and the opinion value is only revealed on the display area for polling indicator 218. In another embodiment, the opinion value is not revealed on the display area for polling indicator 218, but is displayed only by indicator scale 248. Although polling indicator 218 is illustrated in GUI 200B as a slider, one skilled in the relevant art(s) could readily use other graphical metaphors for the opinion responses. For example, instead of including indicator bar 244, GUI 200B, in another embodiment, can display an object similar to polling indicator 218 with a display area. The respondent could use an input device to designate discrete or metaphorical expressions on the display area. Thus, as can be seen, a variety of graphical metaphors can be used to display the respondent's opinion value that is forwarded to polling servers 118a 118n.

As described above, polling indicator 218 provides real time indication of the respondent's current opinion regarding the event that is being viewed on event window 214. Panel value 222 (shown in FIG. 2a) provides real time communication of current opinions for all respondents. The clients include a graphics application program interface (API) that interfaces between the media management server 134 and polling window 210. The API provides for customization of the display attributes without affecting changes to the underlying data management structures. As such, collection and display server 122 tabulates the opinions of all respondents on the panel to generate a composite result and routes this information (via media management server 134) to the clients where the composite result is displayed as panel value 222.

The input device can be a mouse, mouse wheel, joystick, rudder pedals, keyboard, touch screen, microphone, joystick, stylus, light pen, voice recognition unit or any other type of peripheral unit. In an embodiment, the clients are configurable to receive verbal commands to execute various tasks during the polling or post analysis sessions (e.g., interactive voice response (IVR)). Using a rule based expert system, a processing unit enables a voice recognition unit to identify the voice of the user. The aforementioned is a representative list of input devices that can be used with the present invention, it should be understood that any other type of input device capable of measuring or monitoring the reactions or responses of an individual to the event, including, but not limited to, foot pedals, devices for measuring respiration, blinking, pulse or heart rate or other biometrics, or the like as would be apparent to one skilled in the relevant art(s) could be easily included and would not change the scope of the invention. For example, a respondent can attach a biometric device to a hand or other body part. As the respondent moves the hand through space, this movement can be translated and fed to the client to cause a corresponding movement in the polling indicator. Thus, any presently available or future developed device that is responsive to a general-purpose interface is encompassed by the present invention.

III. Media Management Server

Figure 3:
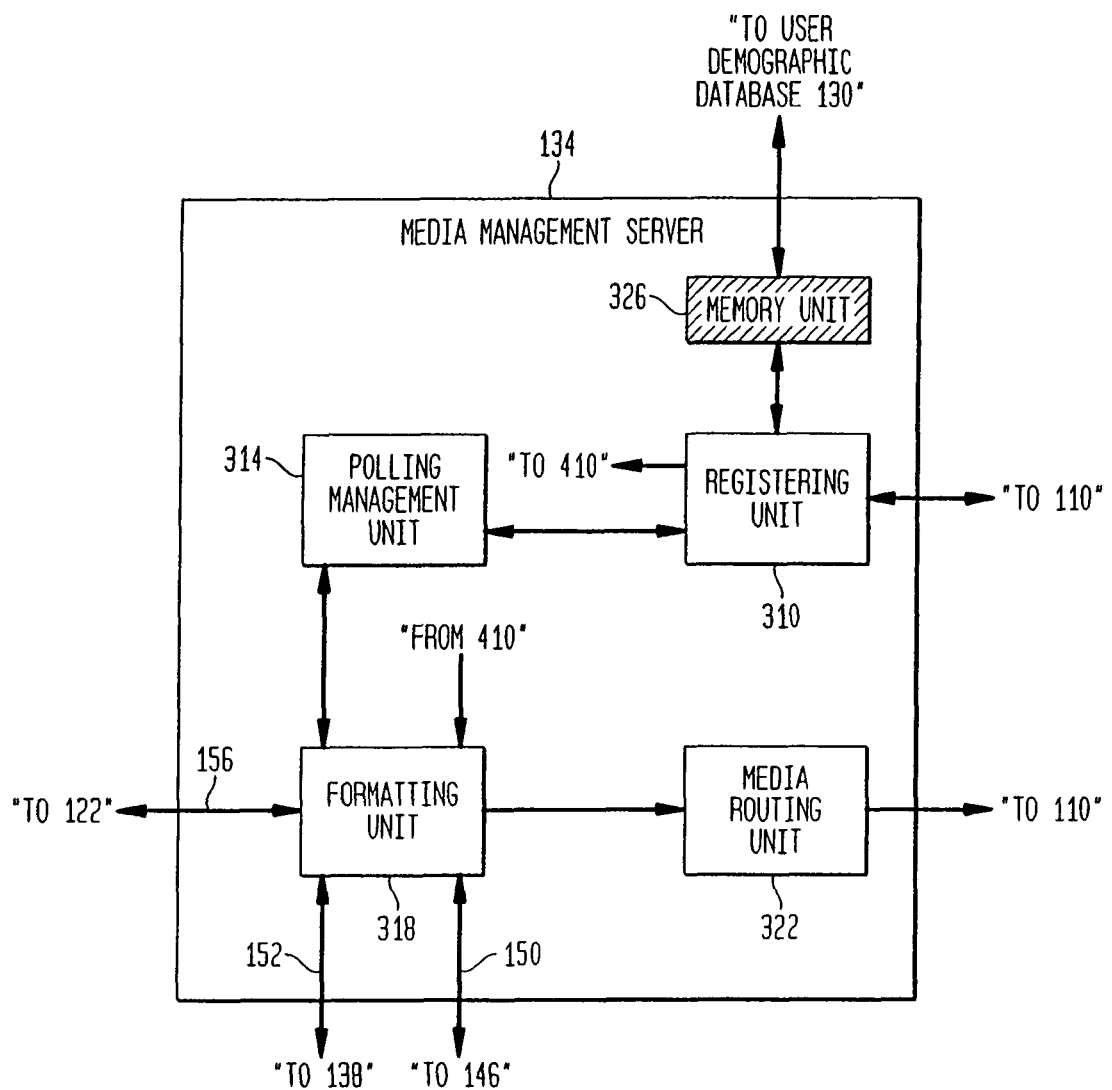
FIG. 3 illustrates a high level block diagram of the configuration of a media management server according to an embodiment of the present invention.

FIG. 3 illustrates, according to an embodiment of the present invention, a block diagram of media management server 134. FIG. 3 is a conceptual illustration of media management server 134 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

As shown in FIG. 3, media management server 134 includes a registering unit 310, polling management unit 314, formatting unit 318, media routing unit 322 and memory unit 326. Registering unit 310 communicates with a plurality of clients and respondents over computer network 110. A respondent registers for a polling event by sending a registration request to registering unit 310. Registering unit 310 verifies the respondent's registration information with the respondent's existing profile, or establishes a new profile, as appropriate, by communicating with user demographic database 130. In an embodiment of the present invention, a copy of user demographic database 130 is located in memory unit 326 for efficient processing. As shown in FIG. 3, registering unit 310 processes the respondent's registration request by contacting memory unit 326. Memory unit 326 maintains coherency with user demographic database 130. In another embodiment of the present invention, registering unit 310 has a direct connection with user demographic database 130. Accordingly, in this embodiment, user demographic database 130 is automatically updated with any changes communicated by the respondent in the registration request.

Polling management unit 314 exchanges signals with registering unit 310 and formatting unit 318. Referring to FIG. 3, registering unit 310 sends a signal to polling management unit 314 to indicate which respondents have been properly registered to participate in the polling event. Registering unit 310 is also configured to transmit respondent requests to terminate a polling session. Upon receipt of the registration or termination signal, polling management unit 314 routes the signal to formatting unit 318 to initialize and manage, or terminate, the polling session, as appropriate. Polling management unit 314 can also terminate a designated or all polling sessions independent of respondent input. The initialization or termination signal is routed to formatting unit 318 to identify the network address (i.e., IP address) of the registered respondents.

Formatting unit 318 provides the initialization instructions for creating the polling GUIs (e.g., GUI 200A and GUI 200B) for the clients. In an embodiment, the instructions are included within a Java applet that is routed to the clients. However, other programming languages, such as JavaScript, C, C++, and the like, can be implemented. Regardless of the design for the polling indicator, indicator bar and the like, formatting unit 318 places the graphics in a certain format and passes the physical size of the graphic images and name of file containing the images to the Java applet to manage them.

Polling management unit 314 also manages the ongoing operations of system 100. Polling management unit 314 provides commands to formatting unit 318 to establish the operational modes for each polling session. For example, polling management unit 314 transmits signals to establish a synchronization scheme for the polling sessions. These instructions determine whether the clients would time stamp the opinion value data with, for example, time codes or frame codes. The time stamps are subsequently used to synchronize the opinion value with the media streams.

The synchronization instructions can also request the clients to reset the client clocks to an absolute time scheme, such as Greenwich Mean Time. Accordingly, polling management unit 314 has the capability to remotely set the client clocks to synchronize the time stamps (i.e., time codes) for all respondents.

Synchronization (in particular, resetting the client clocks) can be used to compensate for delays caused by transportation lag in the video or source signals. Transportation lag may occur when satellite relays or transmissions produce delays. Delays from encoding and decoding as well as network-initiated delays in broadcasts can be compensated on a client-by-client basis. Registering unit 310 provides the specification of the transmission source and other sources of fixed delays. Delay parameters can be set as system constants effecting all clients in a uniform manner or on a client-by-client basis.

Formatting unit 318 embeds the synchronization instructions into the data packets routed to the Java applet in the clients. Polling management unit 314 also provides instructions to formatting unit 318 to synchronize the media streams from multimedia devices 146 with the time stamps generated by time base generator 138.

A second operational mode set by polling management unit 314 is the transmission scheme. Polling management unit 314 determines the frequency for updating the composite result (shown in FIG. 2*a* as panel value 222), as well as sending any graphical data related to the composite result for each polling session. These instructions are routed and implemented by formatting unit 318. Polling management unit 314 also determines the frequency for reporting each individual respondent's value data to load balancer 114. The transmission instructions are routed to formatting unit 318 which, in turns, embeds the transmission instructions into the data packets routed to the Java applet in the clients. For instance, the reporting frequency can be event driven or based on a periodic sampling. If event driven, a respondent's value data is routed to load balancer 114 each time the respondent indicates or changes the opinion value (shown in FIG. 2*a* as polling indicator 218). If based on periodic sampling, the value data would be stored and reported at a designated time. For example, the Java applet can be instructed to transmit a specified number of data frames per unit of time.

Another operational mode determined by polling management unit 314 is automatic reset. If selected, polling management unit 314 would instruct formatting unit 318 to route resetting instructions to the Java applet in the clients. The Java applet would be instructed to automatically return polling indicator 218 to, for example, the "50%" mark if no response has been indicated for a designated period of time.

The Java applet can also be instructed to place the clients in a "time out" state. If selected, after a specified period of time has elapsed since a change in opinion value (shown in FIG. 2*a* as polling indicator 218), polling management unit 314 would terminate or temporarily suspend the polling session and instruct the respondent's browser to download another web page. If the polling session is temporarily suspended, the polling session can be terminated after a specified period of time has elapsed without respondent interaction. The Java applet can be instructed to warn the respondent by generating a dialog box prior to terminating or temporarily suspending the polling session. The time out period for termination and suspension can be adjusted by poll/media manager 142.

In an embodiment, GUI 200A or GUI 200B can include an icon or pull down option (not shown) that enables the respondent to select the time out operational mode. The time out state can be activated after the elapse of a respondent-designated period of time or immediately upon activation. This option would enable the respondent to place the polling session in a "pause" state while the respondent engages in other activities.

While the above is a representative list of operational modes that can be used with the present invention, it should be understood that any other method for managing the operations of the polling session, including interactions with the client, as would be apparent to one skilled in the relevant art(s), can be easily included and would not change the scope of the invention.

Media management server 134 also includes formatting unit 318 that exchanges signals with one or more multimedia devices 146, time base generator 138, collection and display server 122, polling management unit 314, and media routing unit 322. As instructed by polling management unit 314, formatting unit 318 contacts and receives composite opinion data from collection and display server 122. A data packet containing the composite data is subsequently transmitted to media routing unit 322. The frequency for receiving and transmitting the composite data is determined by polling management unit 314, as discussed above.

As instructed by polling management unit 314, formatting unit 318 communicates with a plurality of multimedia devices 146 by sending media management commands to receive information from multimedia devices 146. Media management server 134, therefore, provides a means for centrally controlling each of the multimedia devices 146. For example, formatting unit 318 can instruct one or more multimedia devices 146 to send a stream of media data across network 110.

Formatting unit 318 also sends commands to time base generator 138. In response to the commands, an output data stream with synchronization data is sent to the media management server 134. In an embodiment, the synchronization data is based on an absolute time scheme, such as Greenwich Mean Time. Formatting unit 318 integrates the synchronization data with the media streams from multimedia devices 146 to create synchronized media streams. Alternatively time base generator 138 can send the synchronization data directly to multimedia devices 146 where synchronized media streams are generated and routed to formatting unit 318. Data packets containing the synchronized media streams are then transmitted to the media routing unit 322.

Formatting unit 318 can also configure the media streams to make them compatible with the clients. This can be implemented by utilizing the registration data routed to registering unit 310 by the respondent, that, in turn, is forwarded to the polling management unit 314 and finally to formatting unit 318. For example, the media streams can be formatted to support Apple Microsoft®, or RealNetworks® multimedia applications; Netscape® and Microsoft® browsers capable of handling Java 1.1 or higher, JavaScript, or the like; Windows®, Novell® or Linux® operating systems; HyperText Markup Language (HTML) or Synchronized Multimedia Integration Language (SMIL) languages; or the like as would be apparent to one skilled in the relevant art(s).

As discussed, formatting unit 318 utilizes a combination of technologies, such as HTML, SMIL or a combination of both accessed under an abstraction layer, to coordinate the media streams for display on the clients. By using a single time line, all media on a page can be properly time coordinated and synchronized. Accordingly, system 100 supports multimedia standards developed by Microsoft® technologies, such as, Windows® Media™ Player; RealAudio® and RealVideo® formats from RealNetworks® Inc.; or the like as would be apparent to one skilled in the relevant art(s). In an embodiment, SMIL or a created abstraction of SMIL, is used to provide compatibility with both RealNetworks® and Microsoft® technologies. Elements of media management server 134 can be adopted directly from the client multimedia technologies, such as Windows® Media™ tool offerings.

Media management server 134 also includes media routing unit 322. Media routing unit 322 receives the data packets generated and formatted by formatting unit 318. The data packets include the synchronized media stream representing the event. The data packets also include composite opinion data, including graphics, created by collection and display server 122 and formatted by formatting unit 318. Reading the network address, i.e., IP addresses, in the header frames, routing unit 322 transmits the data packets to the designated respondent over computer network 110.

As previously discussed in reference to FIG. 1, poll/media manager 142 uses media management server 134 to conduct opinion research for an event. In an embodiment, media management server 134 displays a GUI on a display device (not shown). The display GUI provides graphical controls corresponding to the multimedia devices 146. Poll/media manager 142 can use a keyboard, mouse, or other input devices to interact with the media management server 134. As described in reference to the client input device, it should be understood that any other type of input device, including, but not limited to, a touch screen, voice recognition unit, microphone, stylus, light pen, or the like as would be apparent to one skilled in the relevant art(s) could be easily included and would not change the scope of the present invention.

In response to poll/media manager 142 activating a graphical control from display GUI, media management server 134 transmits a media management command to the multimedia device 146 corresponding to the activated graphical control. In this manner, poll/media manager 142 centrally controls the operation of each of the multimedia devices 146. The display GUI also permits poll/media manager 142 to assemble the content of the events, establish the operational modes for polling management unit 314, develop formatting and configuration instructions for formatting unit 318, reconfigure or alter the records in user demographic database 130, and provide similar commands and information to control system 100 as would be apparent to one skilled in the relevant art(s).

IV. Transmission Mode Management

As described above, the transmission scheme is one of the operational modes managed by polling management unit 314. The transmission scheme controls the frequency that each client interchanges communications with system 100. Referring back to FIG. 1, communication interchanges include both the reporting of opinion data streams from the clients to load balancer 114, and the routing of composite results or graphical representations of composite results from media management server 134 to the clients. As described, the transmission scheme can be event driven or based on periodic sampling.

In an embodiment of the present invention, polling management unit 314 sets and manages the transmission scheme by utilizing an application, routine or sub-routine that is referred to as a transmission mode unit. In a preferred embodiment, the transmission mode unit is located inside of polling management unit 314 as a resident component. Alternatively, the transmission mode unit can be externally coupled to, and responsive to queries from, polling management unit 314.

Figure 4:
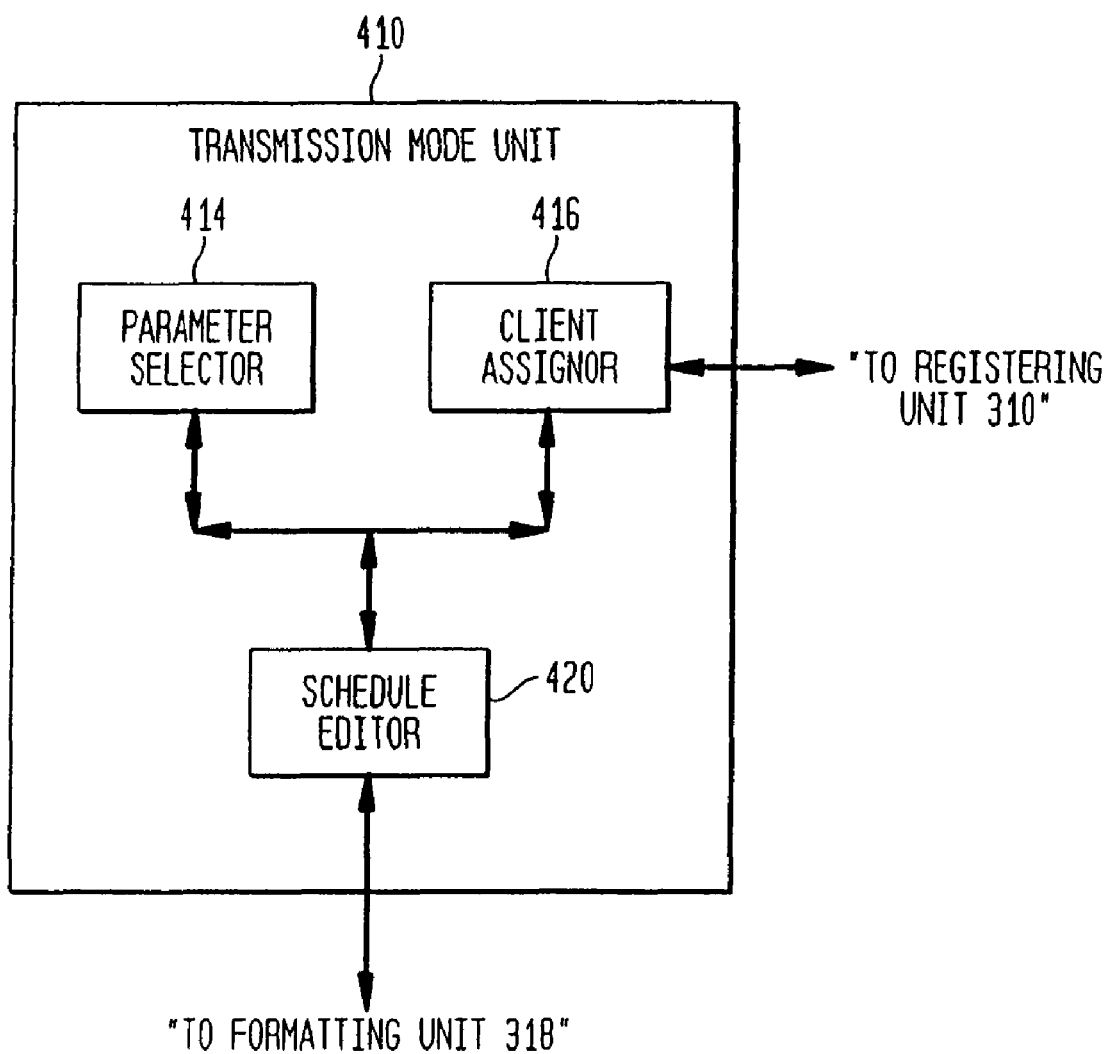
FIG. 4 illustrates a high level block diagram of the configuration of a transmission mode unit according to an embodiment of the present invention.

In FIG. 4, an embodiment of the transmission mode unit (shown as "transmission mode unit 410" is presented as a conceptual illustration that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

As shown in FIG. 4, transmission mode unit 410 includes parameter selector 414, client assignor 416, and schedule editor 420. Parameter selector 414 stores or generates transmission parameters used to support periodic sampling schemes. The transmission parameters include transmission interval, transmission period, and sampling quotient. A transmission interval is a unit of time that provides a framework for controlling communication interchanges. The transmission interval can be based on any time reference, including, but not limited to seconds, milliseconds, nanoseconds, minutes, and the like. For example, a transmission interval can be set as every 3 milliseconds.

A transmission period is a point in time when data is transmitted from a source (e.g., media management server 134 or a polling client). The transmission period, thus, is composed of one or more transmission intervals. For example, a transmission period could be set at four seconds, which means that the transmission period is composed of four one-second transmission intervals and, therefore, communication interchanges would occur every four seconds. In an embodiment, the transmission period is based on the quantity of clients having active sessions with media management server 134 (referred to as "sampling pool"). For example, if fifty respondents are online, the transmission period could be set for fifty transmission intervals with each transmission interval being one millisecond. Therefore, the clients would interchange communications every fifty milliseconds. The transmission period could also be based on a multiple of the sampling pool. For example, the transmission period for fifty respondents could be 10 milliseconds (i.e., one-fifth of the active clients). In another embodiment, the transmission period is determined independently of the sampling pool. In another embodiment, the transmission period and/or transmission interval are selected by polling manager 142 (e.g., researcher or system administrator). In each embodiment, the transmission period and transmission interval can be adjusted manually or automatically to optimize the data flow and create a continuous media stream providing timely and accurate opinion results.

In an embodiment, polling management unit 314 sets the transmission scheme to interchange communications with all clients at the same time ("simultaneous transmission scheme"). Referring back to the example having a four-second transmission period, each client would report its opinion data and/or receive display updates on every fourth second. In another embodiment, polling management unit 314 instructs transmission mode unit 410 to generate a staggered transmission scheme. Referring, once again, to the previous example, the transmission period could be four seconds. However, the transmission interval could be two seconds. In this embodiment, all clients would interchange communications every four seconds, but only a fraction of the clients would interchange communications at a given time. In other words, a fraction would transmit or receive data after the first two seconds, another fraction would interchange data after the next two seconds, and so forth. Nonetheless, at every four-second time period, all clients would have interchanged communications.

Another parameter is the sampling quotient, which is used to support staggered transmissions. The sampling quotient is used to determine the subset of clients that engages in communication interchanges at each transmission interval. In a preferred embodiment, the sampling quotient is the inverse of the transmission period. However, the sampling quotient can be a multiple of the inverse of the transmission period, or it can be selected independently of the transmission period.

Client assignor 416 is a second component of transmission mode unit 410. Client assignor 416 queries or receives updates from registering unit 310 to extract the quantity and identity of clients having an active session with system 100. As discussed, parameter selector 414 determines when a client interchanges communications. Client assignor 416 determines which client interchanges communications. If a simultaneous transmission scheme is being implemented, client assignor 416 sends the addresses of all clients to schedule editor 420 to receive identical transmission periods and intervals. If a staggered transmission scheme is being implemented, client assignor 416 queries parameter selector 414 for the sampling quotient to divide the sampling pool of active clients into multiple sampling classes. Client assignor 416 would, then, assign each client to an appropriate sampling class, and forward this information to schedule editor 420.

Schedule editor 420 receives input from parameter selector 414 and client assignor 416, and prepares a transmission schedule for each client identified by client assignor 416. In an embodiment, the transmission schedule is integrated into an interchange application, formatted as a Java applet, that is routed to each client. It should be understood that other programming languages, such as JavaScript, C, C++, and the like, can be used in lieu of Java, and is considered to be within the scope of the present invention.

For simultaneous transmissions, only one transmission schedule is prepared. For staggered transmissions, a separate transmission schedule is prepared for each sampling class created by class assignor 416. The transmission schedule informs each client when it should commence data transmissions and media routing unit 322 when it should broadcast updates to a particular client or class of clients. Therefore, each transmission schedule would indicate the transmission interval for beginning the transmissions and the transmission period for subsequent transmissions.

FIG. 7 illustrates an embodiment of transmission schedules prepared for three sampling classes. FIG. 7 shows a portion of a transmission schedule for three classes for twenty-one transmission intervals. Accordingly, additional classes and transmission intervals can be added to implement the present invention. In this exemplary embodiment, binary codes designate transmission periods for each class. Specifically, "1" instructs the clients and media routing unit 322 to interchange communications, and "0" instructs the clients and media routing unit 322 to hold communications. The transmission period for each is four transmission intervals (e.g., milliseconds). However, class 1 commences interchanging communications at transmission interval four and repeats at transmission intervals eight, twelve, sixteen, twenty, twenty-four, etc. Class 2 starts at transmission interval five and repeats at transmission intervals nine, thirteen, seventeen, twenty-one, twenty-five, etc. Finally, class 3 starts at transmission interval six and repeats at transmission intervals ten, fourteen, eighteen, twenty-two, etc. As demonstrated, each class staggeredly communicates with system 100. This methodology reduces the bandwidth requirements for managing simultaneous interactive sessions with multiple clients. It also enables the system 100 to increase the sampling pool to handle more active sessions with multiple respondents.

In another embodiment, multiple transmission periods can be assigned for multiple classes. In this embodiment, class assignor 416 is programmable to designate a primary class and one or more distinct secondary classes. The primary class would operate on a different transmission period than the other secondary classes. For example, the primary class can be scheduled to interchange communications every four milliseconds and the secondary classes can be schedule to interchange communications every eight milliseconds. Alternatively, each secondary class can operate on a different transmission period, e.g., eight milliseconds, sixteen milliseconds, etc. This embodiment would permit a primary class of clients (e.g., active respondents) to receive updates or transmit data on a more regularly scheduled basis than other clients (e.g., non-responding observers or researchers).

FIG. 8 illustrates an embodiment of transmission schedules prepared for a primary sampling class and two secondary sampling classes. FIG. 8 also shows a portion of a transmission schedule for three classes for twenty-one transmission intervals. Accordingly, additional secondary classes and transmission intervals can be added to implement the present invention. As shown, the transmission period for the primary class is four transmission intervals (e.g., milliseconds). The primary class would commence interchanging transmissions at transmission interval four and repeat at transmission intervals eight, twelve, sixteen, twenty, twenty-four, etc. The secondary classes, however, operate on a different transmission period. Secondary class 1 starts at transmission interval five and repeats at transmission intervals ten, fifteen, twenty, twenty-five, etc. Secondary class 2 starts at transmission interval seven and repeats at transmission intervals fourteen, twenty-one, twenty-eight, etc.

As demonstrated in FIGS. 7 and 8, a staggered communications scheme enables system 100 to allocate resources to handle larger panels and more opinion research projects (i.e., multiple polls). A significant advantage of staggered communications is a substantial savings in bandwidth requirements for managing simultaneous sessions. Moreover, the system servers are allotted more time to process and respond to client feedback. The above-mentioned transmission periods (i.e., four milliseconds, five milliseconds, seven milliseconds) have been provided by way of example. Other transmission periods or combinations of transmission periods can be used to give the system servers more time to process client data, reduce the burden on the system resources, minimize the frequency of sampling classes transmitting data at the same transmission interval, or the like.

The transmission schedule also includes data preparation and formatting instructions that are to be sent to the clients. In an embodiment, schedule editor 420 requests the clients to aggregate multiple data frames or payloads into a single data packet. For example, the clients could be requested to aggregate a specified quantity of frames prior to transmission, or transmit all data frames collected and aggregated within a specified time frame (e.g., transmission period). In another embodiment, schedule editor 420 generates instructions to compress frames and/or packets. Other instructions can include encryption commands to secure the client-server data path. The encryption instructions can use commonly deployed techniques, such as, Data Encryption Standard supported by the National Bureau of Standards, ANSI's Data Encryption Algorithm, public key encryption introduced by Diffie and Hellman (D H), the El Gamal (EG) public key system, RSA public keys developed by RSA Security Inc., DSA digital signature algorithm, and the like as would be apparent to one skilled in the relevant art(s).

In an embodiment, the transmission schedule includes synchronization instructions for the clients. As discussed above, polling management unit 314 is configurable to create synchronization instructions to reset all client clocks (or similar time-keeping mechanisms) to an absolute time standard. The transmission schedule uses synchronization to place all clients on a common time schedule during communication interchanges.

After schedule editor 420 has prepared the interchange application that contains the transmission schedule, the application is sent to formatting unit 318 which forwards the instructions to the clients or implements the transmission instructions for media management server 134, as discussed above.

V. Software and Hardware Embodiments

The present invention (e.g., system 100, media management server 134, collection and display server 122, polling servers 118*a* 118*n*, load balancer 114, user demographic database 130, data checkpoint and storage database 126, or any part thereof) can be implemented using hardware, software or a combination thereof and can be implemented in one or more computer systems or other processing systems. In fact, in an embodiment, the invention is directed toward one or more computer systems capable of carrying out the functionality described herein.

Figure 5:
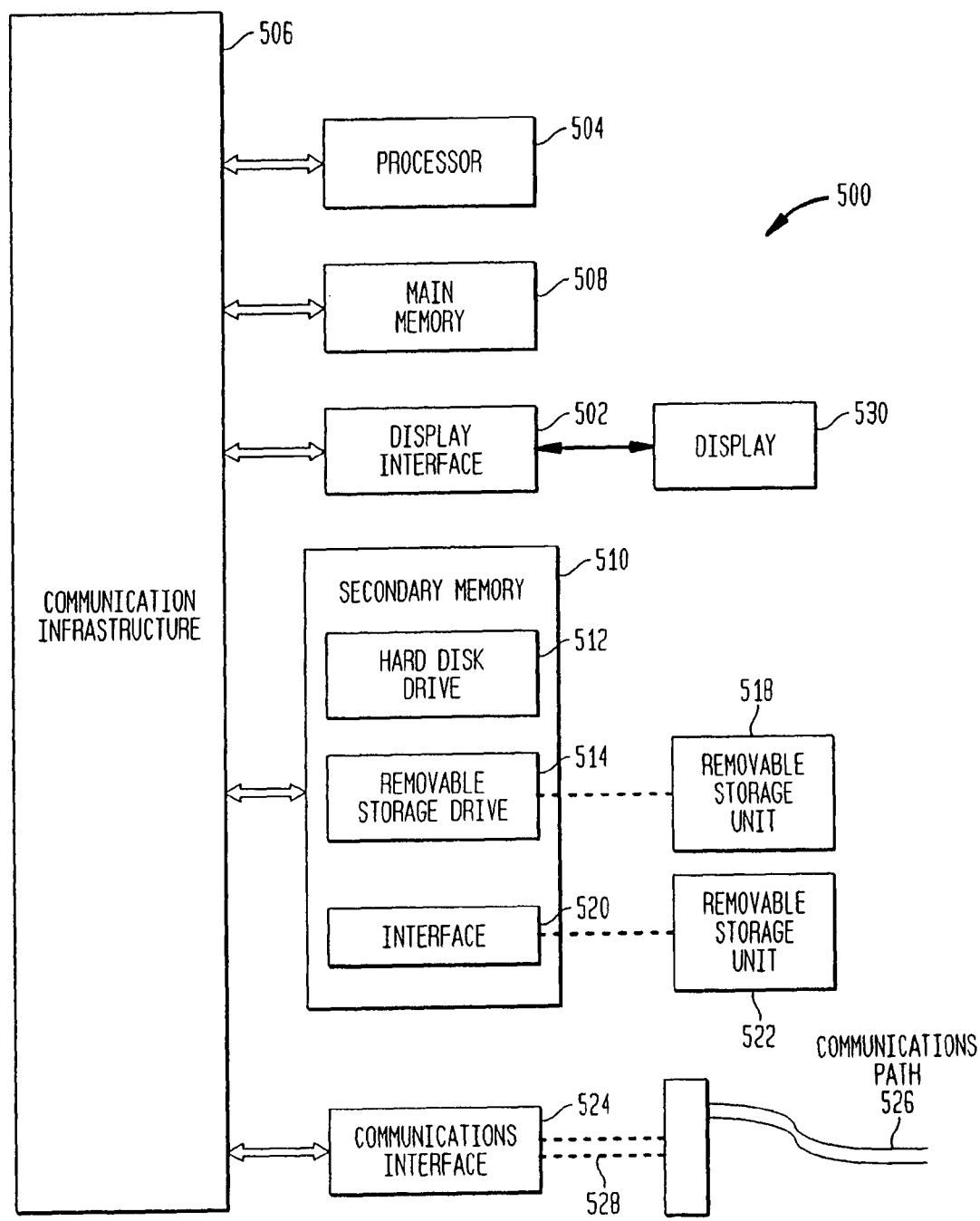
FIG. 5 is a block diagram of an example computer system useful for implementing the present invention.

Referring to FIG. 5, an example computer system 500 useful in implementing the present invention is shown. The computer system 500 includes one or more processors, such as processor 504. The processor 504 is connected to a communication infrastructure 506 (e.g., a communications bus, cross over bar, or network). Various software embodiments are described in terms of this exemplary computer system. After reading this description, it will become apparent to a person skilled in the relevant art(s) how to implement the invention using other computer systems and/or computer architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to removable storage drive 514. As will be appreciated, the removable storage unit 518 includes a computer usable storage medium having stored therein computer software and/or data.

In alternative embodiments, secondary memory 510 can include other similar means for allowing computer programs or other instructions to be loaded into computer system 500. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Examples of communications interface 524 can include a modem, a network interface (such as an Ethernet card), a communications port, a PCMCIA slot and card, etc. Software and data transferred via communications interface 524 are in the form of signals 528 which can be electronic, electromagnetic, optical or other signals capable of being received by communications interface 524. These signals 528 are provided to communications interface 524 via a communications path (i.e., channel) 526. This channel 526 carries signals 528 and can be implemented using wire or cable, fiber optics, a phone line, a cellular phone link, an RF link and other communications channels.

In this document, the terms "computer program medium" and "computer usable medium" are used to generally refer to media such as removable storage drive 514, a hard disk installed in hard disk drive 512, and signals 528. These computer program products are means for providing software to computer system 500. The invention is directed to such computer program products.

Computer programs (also called computer control logic) are stored in main memory 508 and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software can be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Generating Transmission Schedules

Figure 6:
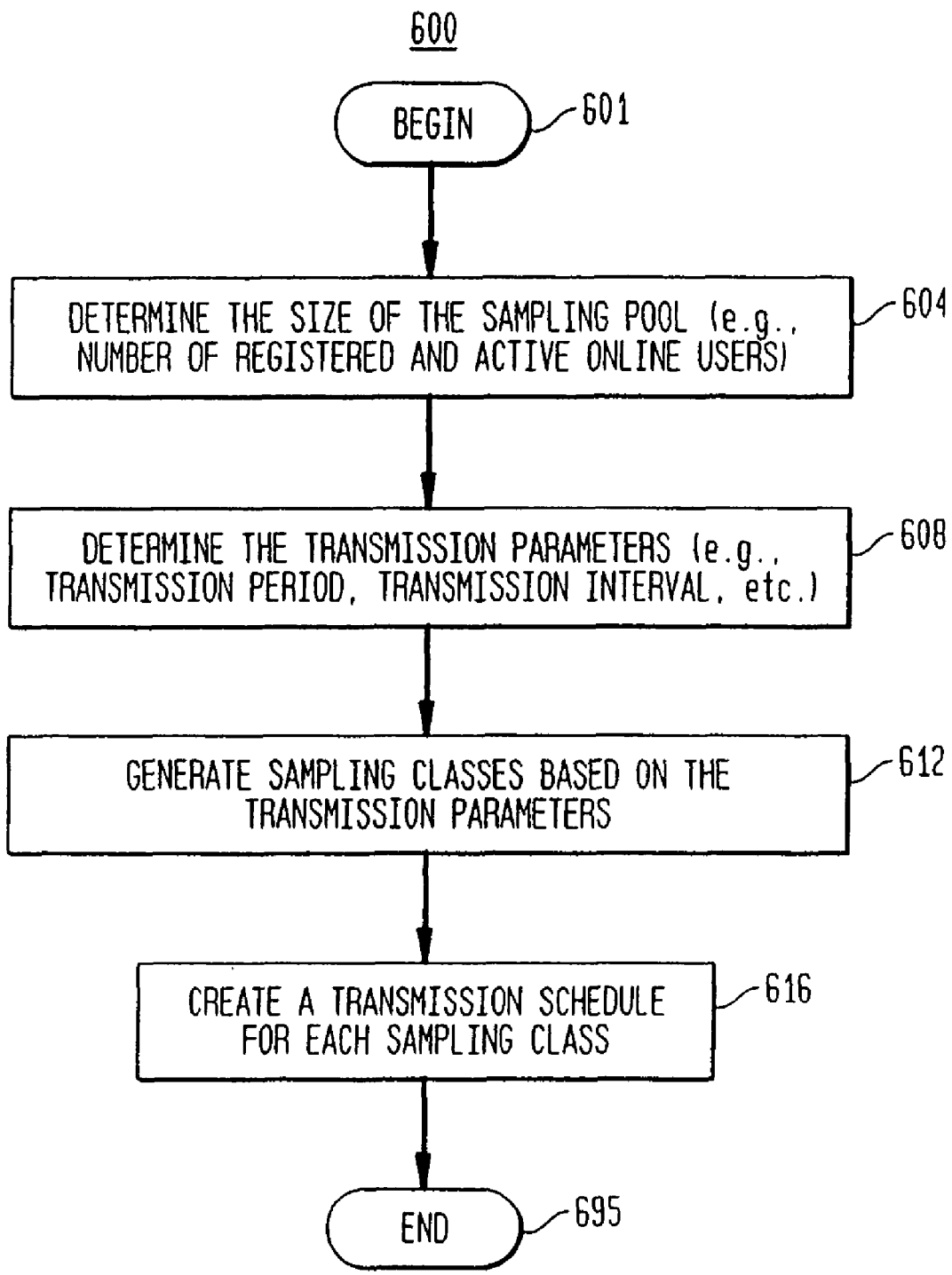
FIG. 6 illustrates a high level operational flow diagram for the steps involved in generating a transmission schedule according to an embodiment of the present invention.

Referring to FIG. 6, flowchart 600 represents the general operational flow of an embodiment of the present invention. More specifically, flowchart 600 shows an example of a control flow for generating a transmission schedule to set the transmission mode for gathering opinion research over computer network 110.

Referring to FIG. 6, the control flow of flowchart 600 begins at step 601 and passes immediately to step 604. At step 604, registering unit 310 identifies the sampling pool for an opinion research event. The total number of clients having an active session is tallied and forwarded to client assignor 416. Registering unit 310 also supplies the addresses (e.g., IP address and the like) for each client to client assignor 416.

At step 608, parameter selector 414 selects the appropriate transmission interval, transmission period and sampling quotient. At step 612, the sampling classes are created from the sampling quotient. If a simultaneous transmission scheme has been requested, the sampling quotient is ignored and the sampling class embodies the entire sampling pool. For staggered transmissions, the sampling quotient is used to create multiple sampling classes. Each sampling class would receive a separate transmission schedule to produce staggered communication interchanges with the clients. For example, if the sampling pool is twenty active clients and the transmission period is five seconds, the sampling quotient is 0.20 (if determined as the inverse of the transmission period). Applying the sampling quotient to the sampling pool would create a sampling rate of four clients per second. Thus, the transmission schedule would contain five sampling classes for sampling four clients every second.

At step 616, an interchange application is created to report and/or implement the transmission schedule. For staggered transmissions, each client class would receive a separate schedule that informs the clients when to report their media streams. Similarly, media routing unit 322 would also be instructed to stream opinion data updates to each client class according to the schedule. The interchanges between the clients and system 100 are structured to enable each class to transmit and receive opinion data at distinct and staggered transmission intervals. The transmission schedule would permit the clients in each class to interchange subsequent transmissions after the completion of their indicated transmission period.

For simultaneous transmissions, all clients would interchange communications at the same transmission interval, and repeat the interchanges at the next transmission period. In an embodiment, the transmission schedule includes commands to synchronize all client clocks to ensure that the clients or sampling classes report data at the properly scheduled time interval. In an embodiment, the transmission schedule includes data formatting and preparation instructions to compress, aggregate, packetize and/or encrypt the opinion data prior to transmittal.

After the interchange application has been created and sent to formatting unit 318 and media routing unit 322 for implementation, the control flow ends as indicated by step 695.

VII. CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A method, executing on a server, for managing communications between the server and a plurality of clients over a computer network, comprising:
    determining a transmission period for periodically sampling a sampling class of the plurality of clients having an active session of streaming communication with the server, wherein the sampling class includes at least one client, and wherein the transmission period determined for the sampling class includes a plurality of transmission intervals; and
    interchanging communications with the sampling class over the computer network in accordance with a transmission schedule determined for the sampling class based on the transmission period determined for the sampling class.

2. The method of claim 1, wherein the interchanging communications comprises:
    polling a first sampling class according to a first transmission schedule having a first beginning transmission interval and a first transmission period determined for the first sampling class; and
    polling a second sampling class according to a second transmission schedule having a second beginning transmission interval and a second transmission period determined for the second sampling class.

3. The method of claim 2, wherein the first beginning transmission interval is different from the second beginning transmission interval.

4. The method of claim 3, wherein interchanging communications includes interchanging communications according to a first transmission period and a second transmission period that are different from one another.

5. The method of claim 2, wherein interchanging communications includes interchanging communications according to a first transmission period and a second transmission period that are the same.

6. The method of claim 2, wherein interchanging communications includes interchanging communications according to a first transmission period and a second transmission period that are different from one another.

7. The method of claim 1, further comprising:
    determining a plurality of sampling classes from a sampling pool of the plurality of clients having an active session of streaming communication with the server, and
    determining a respective transmission period for the sampling classes.

8. The method of claim 7, further comprising assigning the clients of the sampling pool to corresponding ones of the plurality of the sampling classes.

9. The method of claim 1, further comprising:
    dividing a number of clients in the sampling class by the transmission period determined for the sampling class to derive a sampling rate for the sampling class.

10. The method of claim 1, wherein the interchanging communications comprises staggering an interchange of communications between the server and clients of a sampling pool having an active session of streaming communication with the server, based on an assigned sampling class of the clients of the sampling pool.

11. The method of claim 1, further comprising transmitting a communication interchange application, including the transmission schedule determined for the sampling class, to at least one client of the sampling class to implement the transmission schedule determined for the sampling class in the at least one client of the sampling class.

12. The method of claim 1, wherein the interchanging communications comprises at least one communication interchange of:
    receiving at the server an opinion data stream from a client; and
    routing composite results or graphical representations of the composite results from the server to a client.

13. The method of claim 1, wherein the interchanging communications further comprises receiving multiple payloads aggregated into a single data packet based on instructions provided to at least one client of the sampling class with the transmission schedule.

14. The method of claim 1, wherein the interchanging communications further comprises receiving a compressed and encrypted data packet payload based on instructions provided to at least one client of the sampling class with the transmission schedule.

15. The method of claim 1, wherein the interchanging communications further comprises receiving multiple payloads, generated during the transmission period, and aggregated into a single data packet based on instructions provided to at least one client of the sampling class with the transmission schedule.

16. The method of claim 1, wherein the interchanging communications further comprises receiving a predetermined quantity of payloads aggregated into a single data packet based on instructions provided to at least one client of the sampling class with the transmission schedule.

17. The method of claim 1, wherein the interchanging communications comprises providing instructions with the transmission schedule to at least one client of the sampling class to synchronize a clock associated with the at least one client of the sampling class based on the instructions provided with the transmission schedule to the at least one client of the sampling class, wherein the clock is configured to compute transmission intervals for the transmission period.

18. The method of claim 1, wherein the interchanging communications comprises polling at least one client of the sampling class at a designated transmission interval of the transmission period, designated by the transmission schedule for the sampling class, respectively for the transmission periods for the sampling class.

19. The method of claim 1, wherein the interchanging communications comprises receiving a report from at least one client of the sampling class at a designated transmission interval of the transmission period, designated by the transmission schedule for the sampling class, respectively for the transmission periods of the sampling class.

20. The method of claim 1, further comprising determining the transmission period for the sampling class by analyzing a quantity of clients in a sampling pool of the plurality of clients having an active session of streaming communication with the server.

21. The method of claim 1, wherein the interchanging communications includes transmissions over the Internet.

22. The method of claim 1, wherein interchanging communications includes interchanging communications according to a transmission schedule for the sampling class that includes a beginning transmission interval.

23. A system for interchanging communications between a server and a plurality of clients over a computer network, comprising:
    a transmission mode unit comprising processing hardware configured to determine a transmission period for periodically sampling a sampling class of the plurality of clients having an active session of streaming communication with the server, wherein the sampling class includes at least one client, and wherein the transmission period determined for the sampling class includes a plurality of transmission intervals, and
    wherein the transmission mode unit is configured to generate a transmission schedule for the sampling class based on the transmission period determined for the sampling class.

24. The system of claim 23, further comprising:
    a registering unit configured to maintain a current log of clients having an active session of streaming communications with the server.

25. The system of claim 23, wherein the transmission mode unit further comprises:
    a client assignor configured to create at least one sampling class from a sampling pool of the plurality of clients having an active session of streaming communication with the server.

26. The system of claim 23, wherein the transmission mode unit further comprises:
    a schedule editor configured to prepare a communication interchange application including the transmission schedule determined for the sampling class to be transmitted to at least one client of the sampling class to implement the transmission schedule for the sampling class in the at least one client of the sampling class.

27. The system of claim 23, wherein the transmission schedule is configured to stagger the interchange of communications between the server and clients of a sampling pool of clients having an active session of streaming communication with the server based on an assigned sampling class for the clients of the sampling pool.

28. The system of claim 23, wherein the transmission mode unit is configured to generate a transmission schedule for transmitting over the Internet.

29. A system for interchanging communications between a server and a plurality of clients over a computer network, the system comprising:
    means for determining a transmission period for periodically sampling a sampling class of the plurality of clients having an active session of streaming communication with the server, wherein the sampling class includes at least one client, and wherein the transmission period determined for the sampling class includes a plurality of transmission intervals; and
    means for interchanging communications with the sampling class over the computer network in accordance with a transmission schedule determined for the sampling class based on the transmission period determined for the sampling class.

30. The system of claim 29, further comprising:
    means for dividing a number of clients in the sampling class by the transmission period to derive a sampling rate for the sampling class.

31. The system of claim 29, wherein the means for interchanging communications is configured to receive multiple client payloads aggregated into a single data packet based on instructions provided to at least one client of the sampling class with the transmission schedule for the sampling class.

32. The system of claim 29, wherein the means for interchanging communications is configured to receive a client data packet encrypted based on instructions provided to at least one client of the sampling class with the transmission schedule for the sampling class.

33. The system of claim 29, wherein the means for interchanging communications comprises:
    means for polling a first sampling class according to a first transmission schedule including a first beginning transmission interval and a first transmission period determined for the first sampling class; and
    means for polling a second sampling class according to the second transmission schedule including a second beginning transmission interval and a second transmission period determined for the second sampling class.

34. An article of manufacture including a computer readable storage medium having computer executable instructions recorded thereon, execution of which by a computing device causes the computing device to perform operations for interchanging communications with a plurality of clients over a computer network, the operations comprising:
    determining a transmission period for periodically sampling a sampling class of the plurality of clients having an active session of streaming communication with the server, wherein the sampling class includes at least one client, and wherein the transmission period determined for the sampling class includes a plurality of transmission intervals; and
    interchanging communications with the sampling class over the computer network in accordance with a transmission schedule determined for the sampling class based on the transmission period determined for the sampling class.

35. The article of manufacture of claim 34, wherein the operations further comprise transmitting a communication interchange application including the transmission schedule determined for the sampling class to at least one client of the sampling class to implement the transmission schedule for the sampling class in the at least one client of the sampling class.

36. The article of manufacture of claim 34, wherein the operation of interchanging communications comprises staggering the interchange of communications between the computing device and clients of a sampling pool having an active session of streaming communication with the computing device based on an assigned sampling class for the clients of the sampling pool.

37. The article of manufacture of claim 34, wherein the computer network includes the Internet.

38. A method, executing on a client, for communicating with a server over a computer network, comprising:

receiving by the client, over the computer network from the server, a transmission schedule for periodically sampling the client as one client of a sampling class determined by the server from a sampling pool of a plurality of clients having an active session of streaming communication with the server, wherein the transmission schedule is based on a transmission period for periodically sampling the client as one client of the sampling class, and wherein the transmission period includes a plurality of transmission intervals; and interchanging communications with the server over the computer network, as one client of the sampling class, according to the transmission schedule for the sampling class received by the client.

39. The method of claim 38, wherein the interchanging communications comprises aggregating multiple payloads into a single data packet based on instructions received from the server with the transmission schedule.

40. The method of claim 38, wherein the interchanging communications further comprises encrypting the data packet based on instructions received from the server with the transmission schedule.

* * * * *